No. 688,971. Patented Dec. 17, 1901.
J. F. SCHROETER.
ROLLER BEARING.
(Application filed Feb. 4, 1899.)
(No Model.)
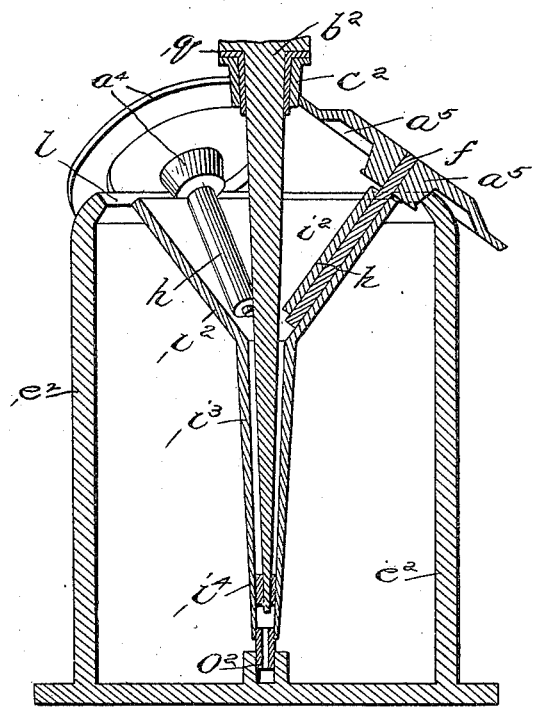
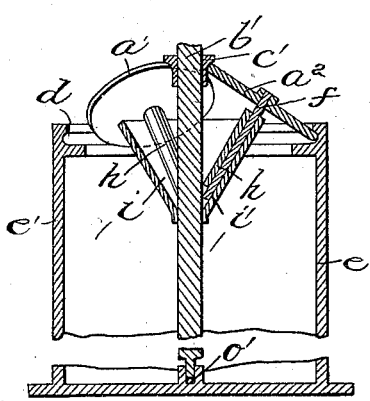
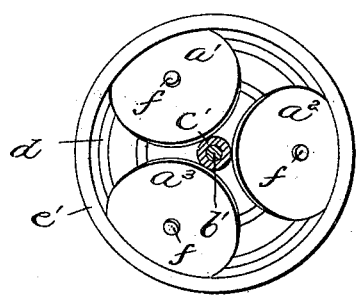
Inventor.
Johan Frederik Schroeter.
by Richard &c.
attys.

UNITED STATES PATENT OFFICE.

JOHAN FREDERIK SCHROETER, OF COPENHAGEN, DENMARK.

ROLLER-BEARING.

SPECIFICATION forming part of Letters Patent No. 688,971, dated December 17, 1901.

Application filed February 4, 1899. Serial No. 704,558. (No model.)

*To all whom it may concern:*

Be it known that I, JOHAN FREDERIK SCHROETER, residing at Copenhagen, in the Kingdom of Denmark, have invented certain new and useful Improvements in Roller-Bearings; and I do hereby declare the following to be a full, clear, and exact description of the invention, such as will enable others skilled in the art to which it appertains to make and use the same.

The idea of supporting of shafts against sheave-like bodies the axles of which rotate in stationary bearings or can travel on two tracks has been embodied in various arrangements or constructions, and these, among others, fill the purpose of diminishing the friction of the shafts. Although this purpose seems to be attained in part, there is still left considerable friction in the bearings of these supports and simultaneous vibration in their axles in the known arrangements, so that in reality no great reduction of friction is obtained.

By the bearing forming the subject-matter of this invention the friction between all bearing parts and the vibrations are made extremely slight.

In the drawings, Figure 1 is a sectional view of one form of the invention. Fig. 2 is a plan view of Fig. 1, and Fig. 3 is a view similar to Fig. 1 of a modification.

As shown in the drawings, a rigid or springy cone or a flanged ring is arranged through which the shaft passes and finds bearings and which hangs on the upper circumference of a number of—for instance, three—sheave-like bodies $a'$, $a^2$, and $a^3$, which are set on axles $f$, which are held in the bearings $h$ in a connecting-piece $i'$, which may be, for instance, funnel-shaped. The sheave-like bodies rest on a single annular track $d$ on the uppermost portions of a stationary frame $e'$ and can roll on the same. By this the effect is obtained that the pressure of the axle $b'$ and the ring $c'$ is transmitted quite directly onto the circular track $d$ by means of the sheave-like bodies $a'$, $a^2$, and $a^3$, and the axles $f$ of these sheave-like bodies are not weighted, as they only need to keep the sheave-like bodies in correct position and carry nothing but the light joint-piece $i'$. On this account the axles $f$ may be very thin, and consequently only an extremely slight friction is produced by their proportionately slow revolution.

As the shaft $b'$ is centered with the ring $c'$ by means of the sheave-like bodies $a'$, $a^2$, and $a^3$ and hung on same, it becomes unnecessary that its lowest extremity should be arranged as a step-bearing. It is sufficient if the shaft is centered in a small centering-bearing—for instance, as shown at $o'$. By this arrangement the loss of power, heating, &c., caused in all rapid-running shafts both in upper neck-bearing and in step-bearings by the considerable friction is avoided.

When the shaft $b'$ is made to revolve rapidly, it will make the sheave-like bodies $a'$, $a^2$, and $a^3$ revolve proportionately slower by means of the ring $c'$, and these sheave-like bodies will run on the circular track $d$ without perceptible pressure or vibration of the axles $f$ and without any friction in the bearings $h$ or in the centering-bearing $o'$ that would be worthy of consideration, as the shaft $b'$ is carried by the sheave-like bodies $a'$, $a^2$, and $a^3$, as mentioned before. A still slower revolution with still decreased friction in these bearings $h$ can be obtained if the sheave-like bodies or plates are arranged as double sheave-like bodies, but preferably in the manner that the pressure is effected directly through these double sheave-like bodies without any oblique pressures. This can be obtained in the manner shown at $a^4$ and $a^5$, Fig. 3, where the sheave-like bodies have, for instance, a boss or hub at the lower side, which can revolve on the circular track $l$ of the uppermost portions of the frame $e^2$. The shaft $b^2$, which is hung on the sheave-like bodies by means of the cone $c^2$, can thus execute a greater number of revolutions to every revolution of the axles $f$ and the funnel $i^2$ with a hollow axle $i^3$.

As shown in Fig. 3, the funnel-shaped connecting-piece $i^2$ can be extended downwardly by the hollow axle $i^3$, this piece being centered below in the bearing $o^2$ and being provided with a centering-bearing $i^4$ around the lowest extremity of the axle $b^2$. This allows that the rotation can be transmitted simultaneously by means of these bearings.

If, for instance, the hollow axle $i^3$ is set into rotation, the sheave-like bodies will travel on the circular track, and thereby increase the speed of rotation of the cone $c^2$ and the shaft $b^2$ by many times. On the contrary, the arrangement of a fast-running motor on top of the shaft $b^2$ will bring about a many-times decreased speed of rotation by means of the hollow axle $i^3$, every effect being obtained without any loss of power by friction worth mentioning and in a similar manner.

As the shaft $b'$ or $b^2$ does not run in neck bearings or collars, a springy ring or cone of some elastic material—rubber, for instance—can be arranged directly around the shaft, whereby shocks or vibrations are obviated in a considerably more perfect manner than hitherto, because formerly it was necessary to adapt the elastic packing on the outside around the collars. Such an elastic packing is shown in Fig. 3 at $q$, where as a matter of example the layer $q$ is arranged between the shaft $b^2$ and the cone $c^2$.

The sheave-like bodies may be constituted of a single sheave, as in Fig. 1, or the double sheave, as in Fig. 3.

I claim as my invention—

1. In combination in means for journaling shafts, the sheave-like bodies, a track on the shaft engaged by said sheave-like bodies, an annular track on which the sheave-like bodies bear and roll while rotating about their axial lines, the axles of the sheave-like bodies and means for holding or controlling the position of the said axles, said axles being free from strain and serving only to guide the sheave-like bodies in their action, the said sheave-like bodies bearing all the strain between the shaft and the track, substantially as described.

2. In combination in means for journaling shafts, the sheave-like bodies, a yielding track on the shaft engaged by said sheave-like bodies, an annular track on which the sheave-like bodies bear and roll while rotating about their axial lines, the axles of the sheave-like bodies and means for holding or controlling the position of the said axles said axles being free from strain and serving only to guide the sheave-like bodies in their action, the said sheave-like bodies bearing all the strain between the shaft and the track, substantially as described.

3. In combination in means for journaling shafts, the sheave-like bodies, a track on the shaft engaged by the said sheave-like bodies, an annular track on which the sheave-like bodies bear and roll while rotating about their axial lines, the axles of the sheave-like bodies, means for holding or controlling the position of said axles, said axles being free from strain and serving only to guide the sheave-like bodies in their action, the said sheave-like bodies bearing all the strain between the shaft and the track, a hollow shaft connected with the means for controlling the axles of the sheave-like bodies, the arrangement being such that the sheave-like bodies may serve to transmit the rotary movement between the two shafts mentioned, substantially as described.

In testimony whereof I have signed this specification in the presence of two subscribing witnesses.

JOHAN FREDERIK SCHROETER.

Witnesses:
THEODOR HOLINS,
JULES BLOM.